United States Patent
Yu et al.

(10) Patent No.: US 6,850,834 B1
(45) Date of Patent: Feb. 1, 2005

(54) METHOD AND SYSTEM FOR DETECTING DEGRADATION OF EGR FLOW DELIVERY

(75) Inventors: Songping Yu, Troy, MI (US); Michael J. Cullen, Northville, MI (US); Gary Lee Danhoff, Redford, MI (US); Robert R. Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/714,748

(22) Filed: Nov. 17, 2003

(51) Int. Cl.[7] ............... F02M 25/07; G01M 19/00; G01P 5/00
(52) U.S. Cl. ............. 701/108; 123/568.16; 73/117.3; 73/118.2
(58) Field of Search ............... 123/568.11, 568.14, 123/568.16, 568.21, 698; 73/117.3, 118.1, 118.2; 701/108; 60/605.2

(56) References Cited

U.S. PATENT DOCUMENTS

| | | | |
|---|---|---|---|
| 5,190,017 A | * 3/1993 | Cullen et al. | 123/568.16 |
| 5,331,936 A | 7/1994 | Messih et al. | |
| 5,505,179 A | 4/1996 | Brennan | |
| 6,076,353 A | * 6/2000 | Freudenberg et al. | 60/605.2 |
| 6,257,214 B1 | * 7/2001 | Bidner et al. | 123/568.16 |
| 6,308,694 B1 | * 10/2001 | Kotwicki et al. | 123/568.16 |
| 6,321,731 B1 | * 11/2001 | Russ et al. | 123/568.14 |
| 6,378,515 B1 | * 4/2002 | Geyer | 701/108 |
| 6,651,492 B2 | * 11/2003 | Kolmanovsky et al. | 73/118.2 |
| 6,659,095 B2 | * 12/2003 | Kotwicki et al. | 123/568.16 |
| 6,687,600 B2 | * 2/2004 | Russell et al. | 701/108 |
| 6,763,708 B2 | * 7/2004 | Ting et al. | 73/118.1 |
| 2004/0144166 A1 | * 7/2004 | Cullen et al. | 73/118.2 |

* cited by examiner

Primary Examiner—Willis R. Wolfe, Jr.

(57) ABSTRACT

A method for determining EGR flow in an internal combustion engine, such flow being from an exhaust manifold of the engine to an intake manifold of the engine through an EGR valve. The method includes using information provided by a mass air flow sensor disposed upstream of an exhaust gas inlet to the intake manifold and information provided by an manifold absolute pressure sensor disposed downstream of such exhaust gas inlet to provide an indication of the flow of exhaust gas into the intake manifold through such inlet. The method compares such estimated exhaust gas flow into the intake manifold with a commanded exhaust gas flow to the EGR valve. With such method, a determination may be made as to whether the EGR valve is operating properly.

5 Claims, 6 Drawing Sheets

METHOD AND SYSTEM FOR DETECTING DEGRADATION OF EGR FLOW DELIVERY

TECHNICAL FIELD

This invention relates generally to methods and systems for detecting degradation of EGR flow delivery.

BACKGROUND AND SUMMARY

As is known in the art, exhaust gas recirculation (EGR) systems are employed in automotive vehicles in order to help reduce engine emissions and improve fuel economy. Such systems typically employ an EGR valve that is disposed between the engine exhaust manifold and the engine intake manifold, and operable, when in an open position, to recirculate a portion of the exhaust gases from the exhaust side of the engine back to the intake side. In one arrangement, the EGR flow rate to the intake manifold is varied according to one or more sensed conditions, such as engine temperature, air charge entering the intake manifold, and engine speed. In one type of EGR control system, electrically actuated EGR valves have also been introduced which use software-implemented control logic. Such control logic controls input to an electric actuator motor which, in turn, positions the EGR valve. In such systems, the control logic may generate pulse width modulated (PWM) signals to power the actuator motor, and modulate the acceleration and deceleration of the EGR valve as it moves to its desired positions.

An open loop system is generally faster and less expensive than a closed loop system, but requires a separate device to diagnose failure. This other device is usually a manifold absolute pressure (MAP) sensor. The cost of the MAP sensor offsets much of the cost benefit of the open loop system. Open loop EGR systems typically use a stepper motor valve, which reliably moves the valve to a requested position. Flow through the valve is inferred by knowing the pressure before and after the valve in concert with its position. Unfortunately, open loop flow prediction degrades rapidly as particulates clog the valve, and requires the valve itself to have minimal variability in its manufactured flow characteristics.

Closed loop systems measure flow using pressures before and after a control orifice, which is located within the EGR flow path. The measured flow is compared to the requested flow. The valve is then moved to minimize flow error. This process has improved steady state performance in terms of the actual flow matching the requested flow, regardless of how degraded or variable the valve flow characteristic may be. However, this system is slower in reaching its final position. Furthermore, if used too aggressively to minimize the time response, closed loop systems can be unstable.

As is also known in the art, one technique used to provide absolute pressure is by inferring such pressure, i.e. an "inferred MAP", from mass airflow (MAF) sensor readings. This technique is described in U.S. Pat. No. 5,505,179, issued Apr. 9, 1996, inventor Daniel G. Brennan, and U.S. Pat. No. 5,331,936, issued Jul. 26, 1994, inventors Messih et al, both assigned to the same assignee as the present invention, the entire subject matter of both such U.S. patent numbers being incorporated by reference.

The inventors have recognized that Manifold Absolute Pressure (MAP) downstream of the EGR flow into the intake manifold consists of three primary contributors: fresh air into the intake manifold upstream of the EGR flow into the intake manifold, EGR flow into the intake manifold, and various uncounted leakages. The amount of fresh air into intake manifold is sensed by the Mass Air Flow (MAF) sensor upstream of the EGR flow into the intake manifold and its contribution to MAP downstream of the EGR flow into the intake manifold plus some modeled leakages may be designated as the inferred manifold absolute pressures (INF_MAP) with zero EGR flow into the intake manifold (i.e., INF_MAP_with 0 EGR).

Thus, the actual manifold pressure downstream of the EGR flow into the intake manifold, (i.e., MAP_ACTUAL) is equal to INF_MAP_with_0_EGR plus pressure from the EGR flow into the intake manifold and pressure from all other sources into the intake manifold upstream of the EGR flow represented as a function of air charge (AIRCHG). That is, $$MAP\_ACTUAL = INF\_MAP\_with\_0\_EGR + func_1(AIRCHG) + func_2(EGR\_FLOW),$$

where:

func1 is a first function;

$func_2$ is a second function;

AIRCHG is cylinder air charge, where AIRCHG(LBS_AIR/Cyl_Fill)=AM (LBS_AIR/min)/(Engine_speed*Number_of_cylinders/2) and AM is measured by the MAF sensor; and EGR_FLOW is the actual EGR flow into the intake manifold and is a function of a desired EGR flow rate, EGR_RATE_DES.

Thus, the contribution of EGR flow to the actual MAP (MAP_ACTUAL) can be determined theoretically by calculating the difference between MAP_ACTUAL and INF_MAP_with_0_EGR, where INF_MAP with 0 EGR is may be calculated from MAP sensor readings, minus uncounted leakages. Therefore, due to certain degree of disagreement between the MAF and MAP sensor readings, hardware to hardware variations, and engine mapping limitation, the resulted difference between MAP_ACTUAL, as measured by the MAP sensor, and the INF_MAP calculate from MAF, excluding EGR contribution is very dynamic and difficult to model. Within a limited engine speed range and at carefully selected engine operation conditions, however, this difference MAP_ACTUAL-MAP_with 0_EGR may be represented as a linear function of cylinder aircharge and the contribution of uncounted leakages is mainly stationary.

More particularly, with the MAF sensor disposed upstream of the exhaust gas inlet to the intake manifold and the MAP sensor disposed downstream of the: inlet, the relationship below follows:

$$MAP\_ACTUAL\ INF\_MAP\_with\_0\_EGR = B0 + B1*AIRCHG + B2*K*EGR\_RATE\_DES + Noise$$

where:

MAP_ACTUAL is the output of MAP sensor;

INF_MAP_with_0_EGR is the INF_MAP with zero EGR, and determined as a function of MAF sensor readings;

B0 is an offset, determined from engine characterization data B1 is the linear slope for the variation of MAP_ACTUAL-INF_MAP_with_0_EGR with AIRCHG and reflects of difference between measured MAF and measured MAP as a function of AIRCHG and determined from engine characterization data;

B2 is the linear slope for the variation of MAP_ACTUAL-INF_MAP_with_0_EGR with the desired EGR flow and reflects the ratio of actual EGR flow into the intake manifold over the commanded, or desired EGR flow (i.e., EGR_RATE_DES) into the intake manifold. It is determined from engine characterization data. With a fully functional EGR system, B2 is equal 1 theoretically and the desired EGR flow is the same as the actual EGR flow into the intake manifold. Therefore, the estimated B2's value in this method reflects the level of degradation of EGR delivery system.

K is the normalization coefficient to ensure the above equation stands and B2 equals to 1 for a fully functional EGR system.

EGR_RATE_DES is the requested, or commanded, EGR rate. It determines signal sent to the EGR valve for regulating EGR flow into the intake manifold.

Noise is any neglected contributions. Within a preselected window, this term is insignificant; and During characterization of the engine having an EGR valve that is known to be operating properly, data is taken and the coefficients B0, B1 and B2 are determined using for example, least mean square fitting. The parameter B0, B1, and B2 are here estimated by a Recursive Least Squared technique. During normal engine operation, measurements of MAF and MAP are taken every 100 milliseconds for example, and is used to determine MAP_ACTUAL minus INF_MAP_with_0_EGR as a function of cylinder aircharge and desired EGR flow. Using a linear regression on such data and the relationship:

$$MAP\_ACTUAL-INF\_MAP\_with\_0\_EGR=B0\_ACTUAL+B1\_ACTUAL*AIRCHG+B2\_ACTUAL*K*EGR\_RATE\_DES+Noise$$

the coefficients B0_ACTUAL, B1_ACTUAL and B2_ACTUAL are thereby determined. The determined coefficient B2 ACTUAL is compared with the coefficient B2 determined during engine characterization to determine whether the difference between B2 and B2 ACTUAL is within a predetermined acceptable range. If not within such range, an indication is provided that the degradation of EGR system is beyond the acceptable level.

Thus, in accordance with the present invention, a method is provided for determining EGR flow in an internal combustion engine, such flow being from an exhaust manifold of the engine to an intake manifold of the engine through an EGR valve. The method includes using information provided by a mass air flow sensor disposed upstream of an exhaust gas inlet to the intake manifold and information provided by an manifold absolute pressure sensor disposed downstream of such exhaust gas inlet to provide an indication of the flow of exhaust gas into the intake manifold through such inlet. The method compares such estimated exhaust gas flow into the intake manifold with a commanded exhaust gas flow to the EGR valve. With such method, a determination may be made as to whether the EGR valve is operating properly.

With such method, a dynamic equation, which relates the contribution of EGR flow to manifold pressure and an inherent difference between MAP_ACTUAL and INF_MAP, is established within a limited range of engine speeds and at selected engine operation conditions. A Recursive Least Squared technique is applied to estimate EGR flow contribution, which provides a desired means for the degradation detection.

In accordance with another feature of the invention, a method is provided for determining EGR flow in an internal combustion engine, such flow being from an exhaust manifold of the engine to an intake manifold of the engine through an EGR valve. The method includes: determining actual manifold absolute pressure readings from an manifold absolute pressure sensor disposed downstream of an inlet for the EGR flow into the intake manifold; obtaining readings of airflow into the intake manifold upstream of the EGR inlet; computing an inferred manifold absolute pressures from the airflow readings; obtaining samples of a desired EGR flow signal fed to a valve for controlling the EGR flow into the inlet; determining a coefficient B2, such coefficient being a function of: (A) the differences between the determined actual manifold absolute pressure readings and the calculated manifold absolute pressures; and (B) the obtained desired EGR flow samples; comparing the determined coefficient B2 with a predetermined value for B2.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
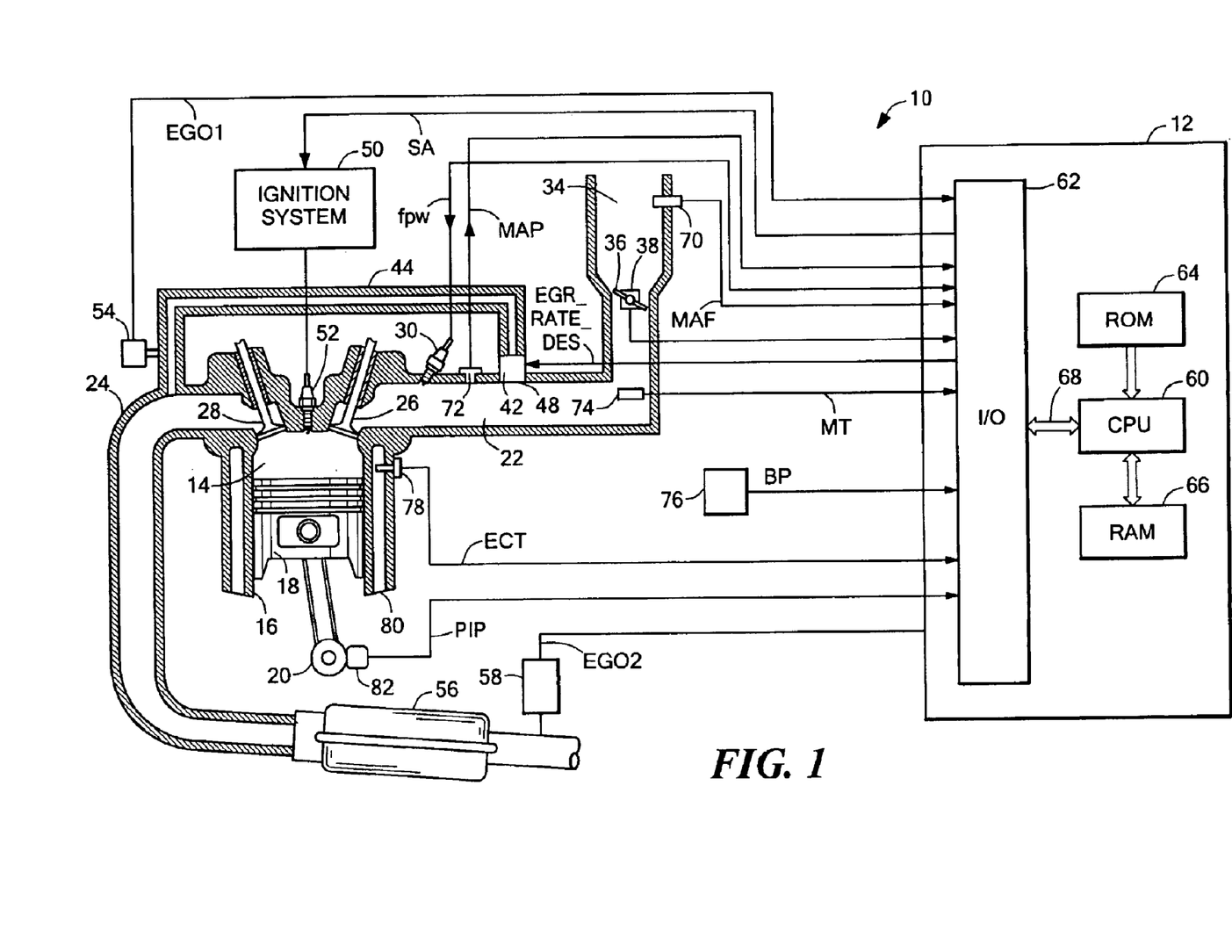
FIG. 1 is a diagram of an internal combustion engine system according to the invention.

Referring now to FIG. 1, an internal combustion engine 10 is shown having a plurality of cylinders, one cylinder of which is shown in FIG. 1, controlled by electronic engine controller 12. Engine 10 includes combustion chamber 14 and cylinder walls 16 with piston 18 positioned therein and connected to crankshaft 20. Combustion chamber 14 is shown communicating with intake manifold 22 and exhaust manifold 24 via respective intake valve 26 and exhaust valve 28. Intake manifold 22 is also shown having fuel injector 30 coupled thereto for delivering liquid fuel in proportion to the pulse width of signal $F_{PW}$ from controller 12. Both fuel quantity, controlled by signal $F_{PW}$ and injection timing are adjustable. Fuel is delivered to fuel injector 30 by a conventional fuel system (not shown) including a fuel tank, fuel pump, and fuel rail. Alternatively, the engine may be configured such that the fuel is injected directly into the cylinder of the engine, which is known to those skilled in the art as a direct injection engine. Intake manifold 22 is shown communicating with throttle body 34 via throttle plate 36. Throttle position sensor 38 measures position of throttle plate 36.

Exhaust manifold 24 is shown coupled to exhaust gas recirculation (EGR) valve 42 via exhaust gas recirculation tube. Exhaust gas recirculation valve 42 is also coupled to intake manifold 22 via inlet 48 to the intake manifold 22.

The flow trough the EGR valve 42 to the intake manifold 22 is controlled by a control signal determined by an EGR_RATE_DES signal and provided by the controller 12.

Conventional distributorless ignition system 50 provides ignition spark to combustion chamber 14 via spark plug 52 in response to controller 12. Two-state exhaust gas oxygen sensor 54 is shown coupled to exhaust manifold 24 upstream of catalytic converter 56.

Two-state exhaust gas oxygen sensor 58 is shown coupled to exhaust manifold 24 downstream of catalytic converter 56. Sensors 54 and 56 provide signals EGO1 and EGO2, respectively, to controller 12 which may convert these signal into two-state signals, one state indicating exhaust gases are rich of a reference air/fuel ratio and the other state indicating exhaust gases are lean of the reference air/fuel ratio.

Controller 12 is shown in FIG. 1 as a conventional microcomputer including: microprocessor unit 60, input/output ports 62, read-only memory 64, here a semiconductor chip, random access memory 66, and a conventional data bus 68. Controller 12 is shown receiving various signals from sensors coupled to engine 10, in addition to those signals previously discussed, including: a mass air flow (MAF) from mass flow sensor 70 coupled to intake manifold 22 before throttle 38; a measurement of manifold absolute pressure (MAP) from pressure sensor 72; an intake manifold temperature (MT) signal from temperature sensor 74; an engine coolant temperature (ECT) from temperature sensor 78 coupled to cooling sleeve 80; and a profile ignition pickup (PIP) signal from Hall effect sensor 82 coupled to crankshaft 20 and used as an engine speed signal producing a predetermined number of equally spaced pulses every revolution of the crankshaft. Also included is a barometer 76 for measuring barometric pressure, BP.

It is noted that the MAF sensor 70 disposed upstream of the exhaust gas inlet 48 to the intake manifold 22 and the MAP sensor 72 is disposed downstream of the inlet 48. With the MAF 70 sensor disposed upstream of the exhaust gas inlet 48 to the intake manifold 22 and the MAP sensor 72 disposed downstream of the inlet 48, the relationship below follows: The flow downstream of the MAP 72 is approximately equal to the EGR flow into the intake manifold 22 plus the mass air flow MAF.

Rather than measure the mass airflow downstream of the MAP 72, using the ideal gas law, it follows that MAP_ACTUAL, as measured by the MAP 72 is a function of the inferred MAP, which is a function of the MAF 70 reading and the EGR flow into the intake manifold. Thus, the actual EGR flow into the intake manifold is a function of the difference between the MAP_ACTUAL as measured by MAP. 72 and INF_MAP which may be calculated from MAF 70. The EGR valve operation can then be assessed by determining whether the actual EGR flow is consistent with the desired, or commanded EGR flow, EGR_RATE_DES.

The inventors have recognized that Manifold Absolute Pressure (MAP) downstream of the EGR flow into the intake manifold consists of three primary contributors: fresh air into the intake manifold upstream of the EGR flow into the intake manifold, EGR flow into the intake manifold, and various uncounted leakages. The amount of fresh air into intake manifold is sensed by the Mass Air Flow (MAF) sensor upstream of the EGR flow into the intake manifold and its contribution to MAP downstream of the EGR flow into the intake manifold plus some modeled leakages may be designated as the inferred manifold absolute pressures (INF_MAP) with zero EGR flow into the intake manifold (i.e., INF_MAP_with_0_EGR).

Thus, the actual manifold pressure downstream of the EGR flow into the intake manifold, (i.e., MAP_ACTUAL) is equal to INF_MAP_with_0_EGR plus pressure from the EGR flow into the intake manifold and pressure from all other sources into the intake manifold upstream of the EGR flow represented as a function of air charge (AIRCHG). That is, $$MAP\_ACTUAL = INF\_MAP\_with\_0\_EGR + func_1(AIRCHG) + func_2(EGR\_FLOW),$$

where:

func1 is a first function;

$func_2$ is a second function;

AIRCHG is cylinder air charge, where AIRCHG (LBS_AIR/Cyl_Fill)=AM (LBS_AIR/min)/(Engine_speed*Number_of_cylinders/2) and AM is measured by the MAF sensor; and EGR_FLOW is the actual EGR flow into the intake manifold and is a function of a desired EGR flow rate, EGR_RATE_DES.

More particularly, $$MAP\_ACTUAL - INF\ MAP\_with\_0\_EGR = B0 + B1*AIRCHG + B2*K*EGR\_RATE\_DES + Noise$$

where:

MAP_ACTUAL is the output of MAP sensor 72;

INF_MAP_with_0_EGR is the INF_MAP with zero EGR, and determined as a function of MAF 70 sensor readings;

B0 is an offset, determined from engine characterization data

B1 is the linear slope for the variation of MAP_ACTUAL−INF_MAP_with_0_EGR with AIRCHG and reflects of difference between measured MAF and measured MAP as a function of AIRCHG and determined from engine characterization data;

B2 is the linear slope for the variation of MAP_ACTUAL−INF_MAP_with_0_EGR with the desired EGR flow and reflects the ratio of actual EGR flow into the intake manifold over the commanded EGR flow into the intake manifold. It is determined from engine characterization data. With a fully functional EGR system, B2 is equal 1 theoretically and the desired EGR flow is the same as the actual EGR flow into the intake manifold. Therefore, the estimated B2's value in this method reflects the level of degradation of EGR delivery system.

K is the normalization coefficient to ensure the above equation stands and B2 equals to 1 for a fully functional EGR system.

EGR_RATE_DES is the request EGR rate. It determines signal sent to the EGR valve for regulating EGR flow into the intake manifold.

Noise is any neglected contributions. Within a preselected window, this term is insignificant; and During characterization of the engine having an EGR valve that is known to be operating properly, data is taken and the coefficients B0, B1 and B2 are determined using for example, least mean square fitting. The parameter B0, B1, and B2 are here estimated by a Recursive Least Squared technique.

Figure 3:
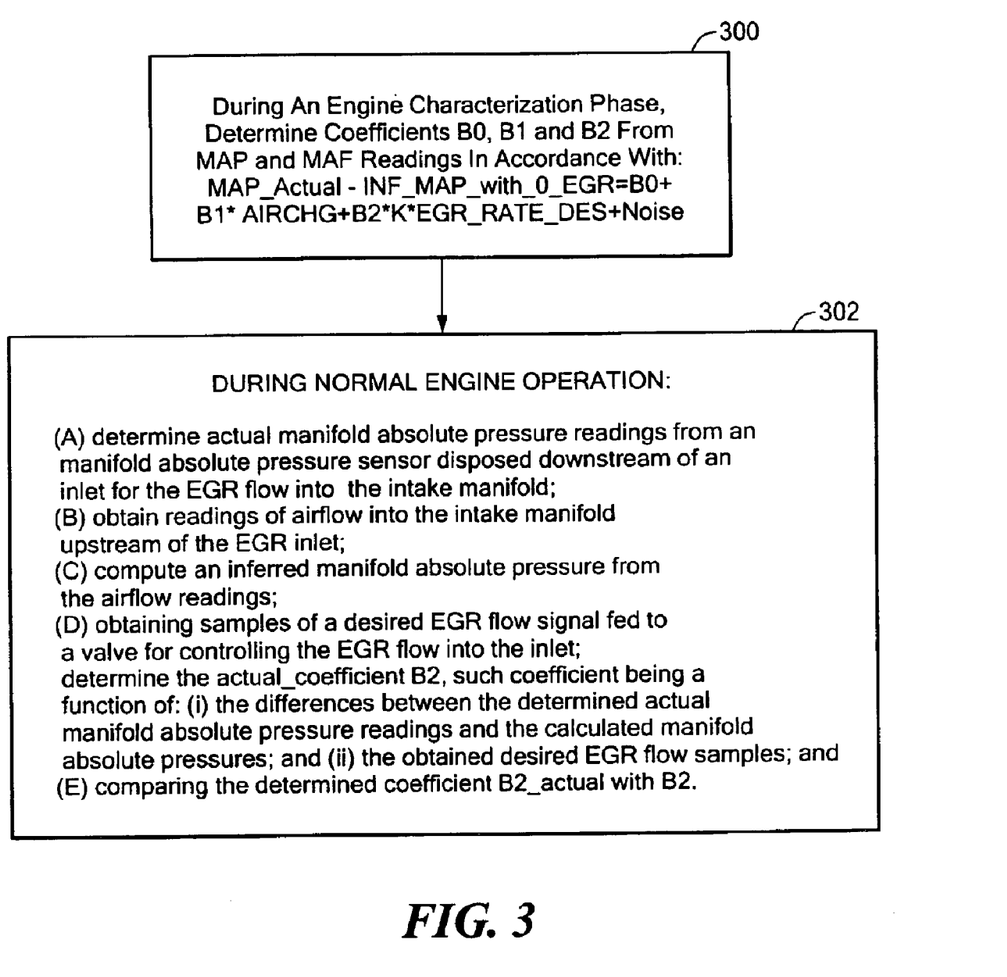
FIG. 3 is a flow diagram of a process used in the engine system of FIG. 1 to determine coefficients used in the system according to the invention.

During normal engine operation, measurements of MAF and MAP are taken every 100 milliseconds, for example and is used to determine MAP_ACTUAL minus INF_MAP with 0 EGR as a function of cylinder aircharge and desired EGR flow. Using a linear regression on such data and the relationship:

$$MAP\_ACTUAL-INF\_MAP\_with\_0\_EGR = B0\_ACTUAL + B1\_ACTUAL*AIRCHG + B2\_ACTUAL*K*EGR\_RATE\_DES + Noise$$

the coefficients B0_ACTUAL, B1_ACTUAL and B2_ACTUAL are thereby determined. The determined coefficient B2_ACTUAL is compared with the coefficient B2 determined during engine characterization to determine whether the difference between B2 and B2_ACTUAL is within a predetermined acceptable range. If not within such range, an indication is provided that the degradation of EGR system is beyond the acceptable level. More particularly, as shown in Step 302 of FIG. 3, during normal engine operation, actual manifold absolute pressure is determined from readings from the manifold absolute pressure sensor 72 disposed downstream of an inlet for the EGR flow into the intake manifold. Readings of airflow into the intake manifold upstream of the EGR inlet are obtained from MAF 70. Inferred manifold absolute pressures are computed from the airflow readings. Samples of a desired EGR flow signal fed to a valve for controlling the EGR flow into the inlet are obtained. A determination is made of the coefficient B2_ACTUAL, such coefficient being a function of: (A) the differences between the determined actual manifold absolute pressure readings and the calculated manifold absolute pressures; and (B) the obtained desired EGR flow samples. A comparison is made between the determined coefficient B2 and the predetermined value for B2. If the difference is outside of a predetermined range, an indication is provided that the EGR system is malfunctioning.

Figure 2:
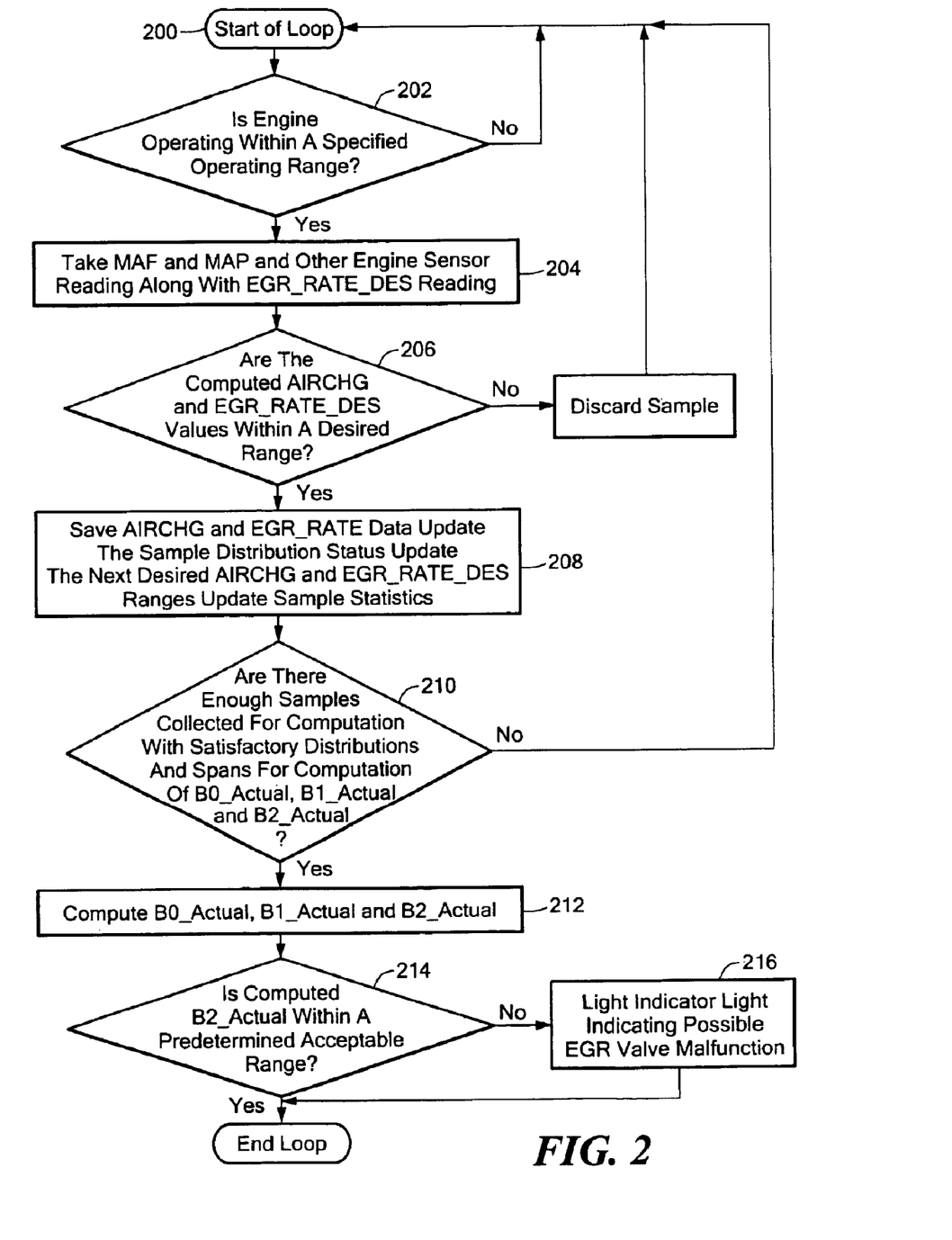
FIG. 2 is a flow diagram of a process used in the engine system of FIG. 1 according to the invention.

As described in the above-referenced U.S. Pat. No. 5,331,939, during steady-state conditions, cylinder air charge is essentially linear with manifold air pressure (MAP) at a given engine speed (N). Accordingly, for a given engine design, values for MAP, N, and cylinder air charge may be collected under steady-state conditions at a standard barometric pressure and temperature. (e.g., 29.9 in Hg and 100 degrees F.) and plotted, as shown in the example plot of FIG. 2?. From that plot, the following equation is developed using a well-known least squares linear regression technique:

$$STAMP = (C0 + C1*N + C2*N^2) + C3*Mc$$

wherein:

STMAP is manifold air pressure at a standard barometric pressure and temperature;

N is the engine speed in RPM;

Mc is the cylinder air charge; and C0, C1, C2, C3 are engine design specific regression coefficients.

In order to determine a manifold air pressure (MAP) value, i.e., determine an "inferred manifold absolute pressure" (INF_MAP), at any given barometric pressure, the equation for STMAP is corrected for changes in barometric pressure from the standard value. This equation is as follows:

$$INF\_MAP = [(C0 + C1*N + C2*N^2)(BP/29.92)] + C3*Mc$$

wherein:

INF_MAP is the inferred manifold absolute air pressure at a given barometric pressure (BP);

BP is barometric pressure (in Hg);

29.92 is the standard barometric pressure (in Hg);

N is the engine speed in RPM;

Mc is the cylinder air charge, AIRCHG; and

C0, C1, C2, C3 are the regression coefficients.

As also described in U.S. Pat. No. 5,331,926, MAP is determined from an equation and two look-up tables. The first look-up table is recorded in terms of RPM, the input, and ΔSTMAP/ΔMc, the output. The second look-up table is recorded in terms of RPM, the input, and STMAP, the output. Values for Mc, STMAP and N, which are used to create the two look-up tables, are collected under steady-state conditions at a standard barometric pressure and temperature and plotted. Using the outputs from the two look-up tables, the value for MAP is determined from the following equation:

$$INF\_MAP = [(STMAP)(BP/29.92)] + (\Delta STMAP/\Delta Mc)*(Mc)$$

wherein:

ΔSTMAP/ΔMc is the output from the first look-up table;

STMAP is the output from the second look-up table;

BP is barometric pressure (in Hg);

29.92 is the standard barometric pressure (in Hg); and

Mc is the cylinder air charge.

There is a linear relationship between STMAP and Mc for a given engine speed. It is noted that the cylinder air charge, Mc, is not identical to the output of MAF sensor, but is directly determined by MAF sensor output. More particularly, the MAF sensor reads the amount of airflow through throttle per minute while the cylinder air charge represents the amount of air in the cylinder for combustion. Once the number of cylinders and engine rotating speed are given, the cylinder air charge can be calculated from MAF output. Thus, the inferred manifold absolute pressure. (INF_MAP) may be calculated as described above from the output of the MAF sensor.

Referring to FIG. 2, a flow diagram of the method used herein to determining EGR flow in an internal combustion engine is shown. The method is implemented by a computer executable program stored in the ROM, here a semiconductor chip.

The method includes using information provided by the mass air flow sensor 70 disposed upstream of an exhaust gas inlet 48 to the intake manifold and information provided by the manifold absolute pressure sensor 72 disposed downstream of such exhaust gas inlet 48 to provide an indication of the flow of exhaust gas into the intake manifold through such inlet 48. The method compares such estimated exhaust gas flow into the intake manifold with the commanded, or desired, exhaust gas flow to the EGR valve, EGR_RATE DES. With such method, a determination may be made as to whether the EGR valve 42 is operating properly.

More particularly, a loop shown in FIG. 2 is performed during normal operation of the engine. In Step 200 the loop starts, here, for example, once every 100 milliseconds.

In Step 202, a determination is made as to whether the engine is operating within a predetermined operating range, or window. If not, the loop is skipped otherwise, MAF and MAP reading are taken, along with other reading, to compute AIRCHG and a reading of EGR_RATE_DES is also taken, Step 204.

In Step 206, a determination is made as to whether the computed AIRCHG and EGR_RATE DES have values within a desired range to force the desired data distribution. If not, discard the current reading and wait for new data in the next loop.

Next, in Step 208, the AIRCHG and EGR_RATE_DES data is saved, the data distribution is updated, the next desired AIRCHG and EGR_RATE DES ranges are updated, and the sampling statistics are updated.

In Step 210, a determination is made as to whether there are enough samples collected with desired distributions and range spans for computation of the coefficients B0_ACTUAL, B1_ACTUAL and B2 ACTUAL from the relationship:

MAP_ACTUAL−INF_MAP_with_0_EGR=B0_ACTUAL+B1_ACTUAL*AIRCHG+B2_ACTUAL*K*EGR_RATE_DES+Noise If not, additional samples are taken; otherwise, once sufficient samples have been taken, B0_ACTUAL, B1_ACTUAL and B2_ACTUAL are computed using linear regression, Step 212.

Next, in step 214, a determination is made as to whether the difference between the coefficient B2 determined during engine characterization and B2 ACTUAL is within a predetermined acceptable range. If not within such range, an indication is provided that the EGR system is not operating properly, Step 216.

It should be noted that B0 and B1 are computed in order to reduce the noise influence on B2 and enhance the signal to noise ratio.

Figure 4A:
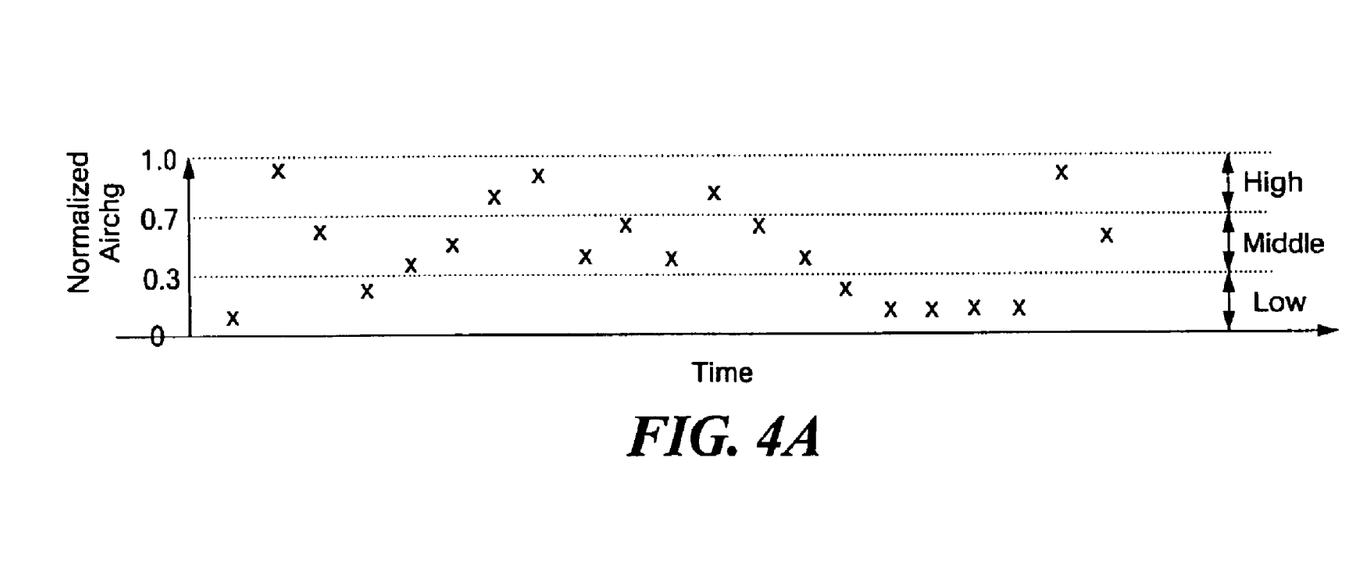
FIGS. 4A and 4B show samples of EGR_RATE_DES and samples of computed normalized AIRCHR, respectively.
Figure 4B:
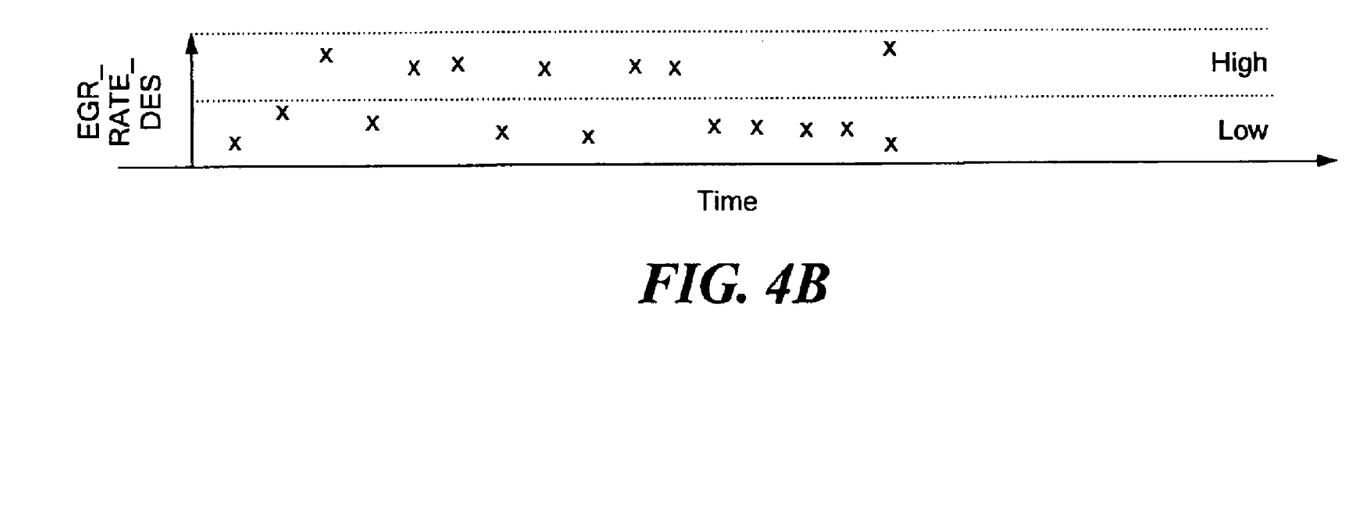

Referring now to FIGS. 4A and 4B, samples of EGR_RATE_DES and samples of computed AIRCHR are taken once every, here for example, 100 milliseconds. It is noted that the normalized AIRCHG ranges from about 0 to 1 theoretically. It has a normal value of 0.2 (at idle) to 0.9 (at full open throttle).). The AIRCHG range is divided into here three regions, a low region, a middle region, and a high region. The size of each region is one third of the total span among all collected samples and is updated dynamically from loop to loop.

Figures 5, 5A:
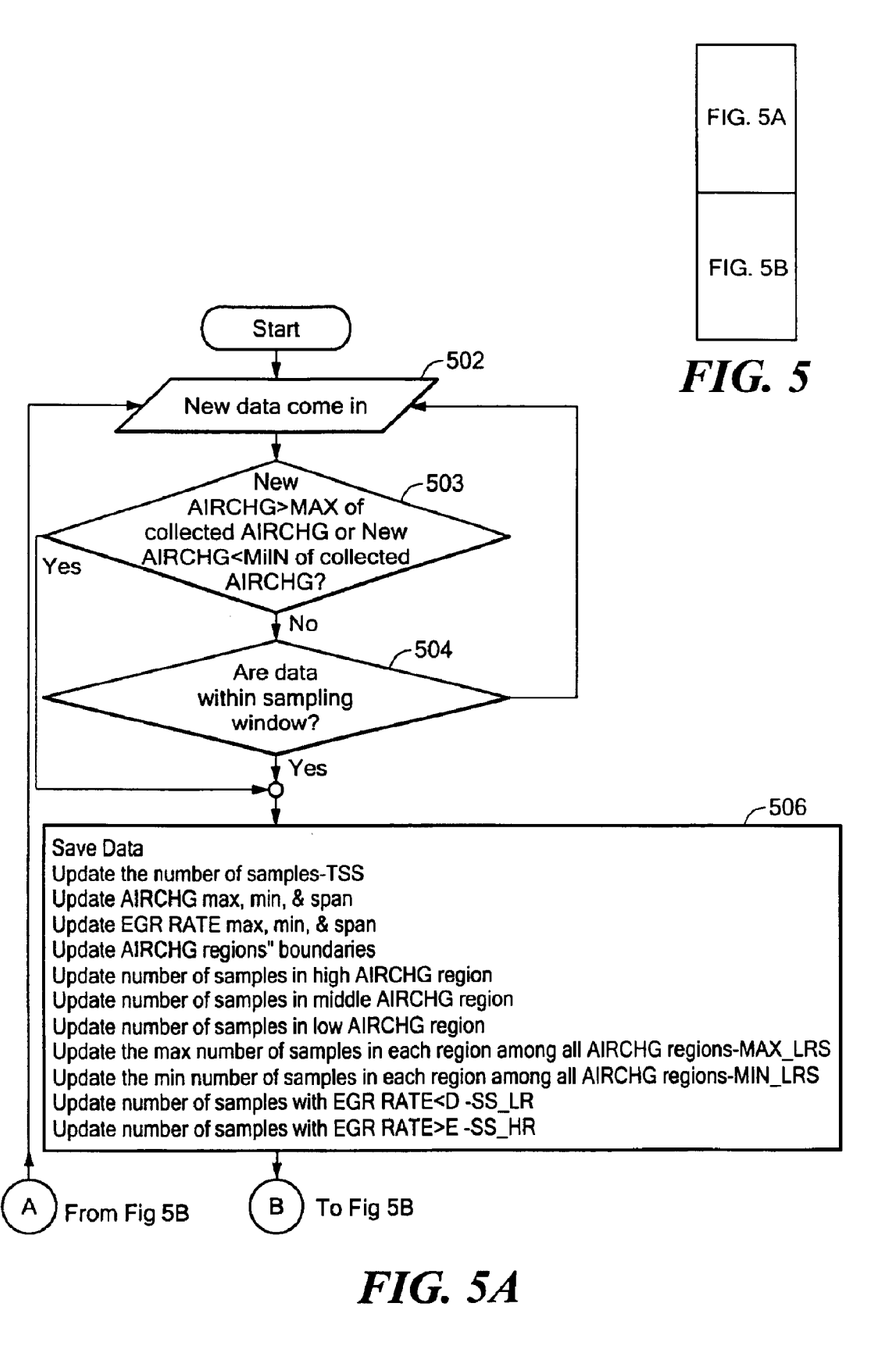
FIG. 5 is a flow diagram of a method used to process data obtained the engine system of FIG. 1 in accordance with the invention.
Figure 5B:
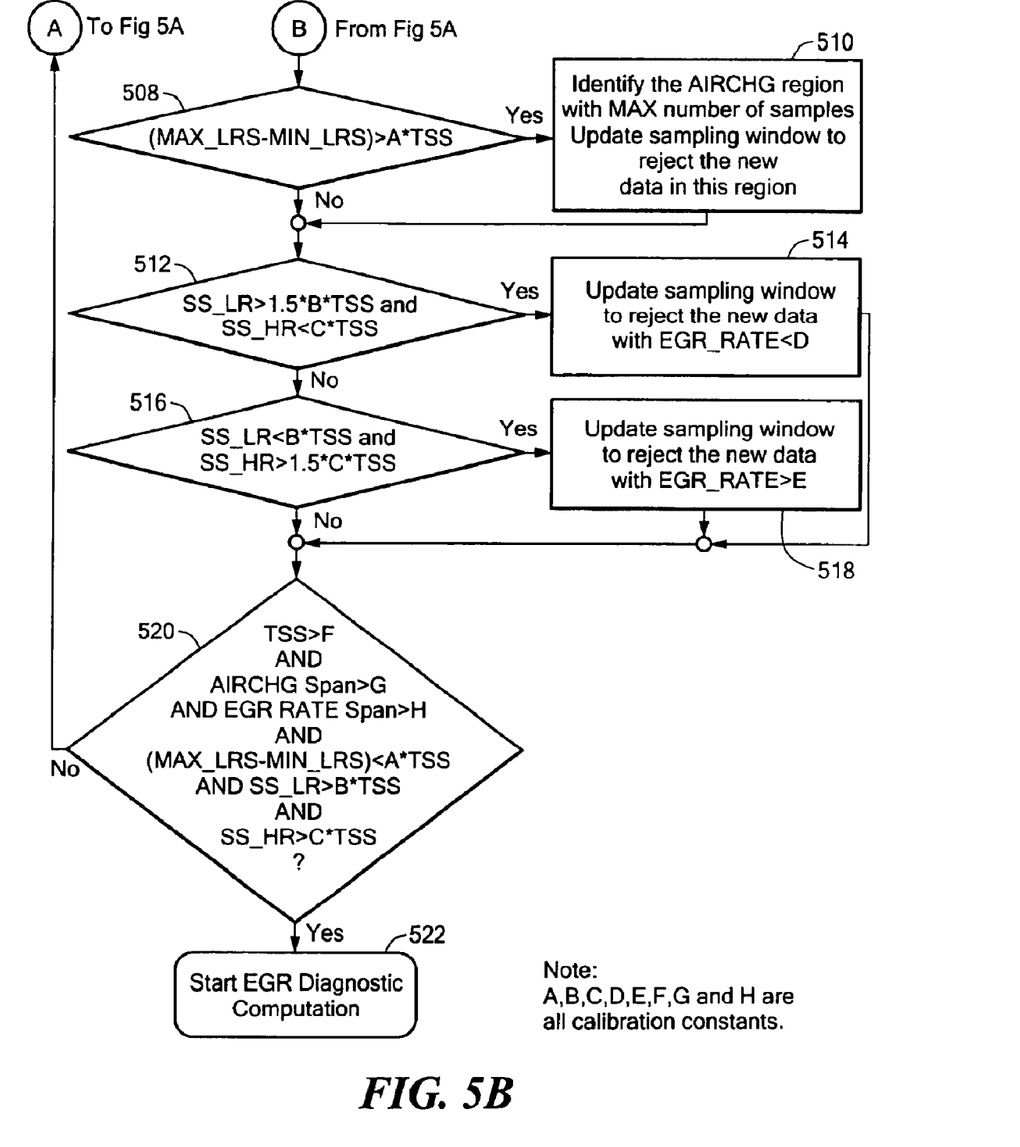

Referring now also to FIG. 5, new data, i.e., AIRCHG and EGR_RATE_DES samples, are taken in Step 502. If new AIRCHG expands the span of collected samples, i.e., new AIRCHG>MAX of collected AIRCHG or new AIRCHG<MIN of collected AIRCHG, Step 503, this is a desirable sample and the process proceeds to Step 506. If not, then a determination is made as to whether the data is within-a predetermined sampling window, Step 504, if not, the data is rejected, otherwise the process, proceeds to Step 506.

In Step 506, the number of samples taken, TSS, is updated. A determination is made as to the maximum value of the samples taken, MAX_VALUE, the minimum value of the samples taken, MIN_VALUE, and the span, SPAN. The process maintains and update of these maximum, minimum, and range (or span) determinations.

The process also maintains an update of the number of samples within the low region, #LOW, within the middle region, #MID, and within the high region, #_HIGH. The process also updates the maximum number of samples in each region among all regions, herein referred to as MAX_IRS. The process also updates the minimum number of samples in each region among all regions, herein referred to as MIN_LRS.

Thus, for example, let it be assumed that there are 15 samples in the low region, and such samples vary between 0.3 and 0.45; there are 20 samples in the middle region and such samples vary between 0.45 and 0.6, and that there are 10 samples in the high region and such samples vary between 0.6 and 0.75. In such example, MAX_VALUE is 0.75, MIN_VALUE is 0.3, SPAN is 0.45, #_LOW is 15, #_MID is 20 and #_HIGH is 10. Further, MAX_LRS is 20 and MIN_LRS is 10.

A similar process is used for EGR_RATE_DES, as shown in FIG. 4B, except here only two regions are monitored, a low region, e.g., from, for example, 0 percent EGR flow rate to D percent EGR rate flow, and a high region, here between E percent EGR flow rate to a maximum scheduled (i.e., desired) EGR flow rate. The process updates the number of samples of EGR_RATE_DES less than D, i.e., SS_LR and the number of samples greater than E, i.e., SS_HR. Further the span or range, ERG_RATE_SPAN is determined and updated.

Next, the process determines, in Step 508, whether (MAX_LRS−MIN_LRS) is greater than a predetermined number of samples, i.e., A*TSS, where A is a calibration constant with a value range of 0 to 1 and TSS is the number of samples taken. If yes, the process identifies the AIRCHG region with the maximum number of samples and updates the sampling window to reject any new samples in this identified region, Step 510, while proceeding to the next Step 512. Otherwise, if (MAX_LRS−MIN_LRS) is less than A*TSS, a determination is made as to whether SS_LR is greater than 1.5*B*TSS, where B is a calibration constant with a value range of 0 to 1 and whether SS_HR is less than C*TSS, where C is a calibration constant with a value range of 0 to 1. If yes, no further samples are needed in the low region, Step 514, so the process updates the sampling window to reject any new samples with an EGR_RATE_DES less than D. Otherwise, if SS_LR is not greater than 1.5*B*TSS and whether SS_HR is not less than C*TSS, the process, in Step 516, determines whether SS_LR is less than B*TSS and SS_HR is greater than 1.5*C*TSS. If yes, no more samples are need in the high region and the process updates the sampling window to reject samples with an EGR_RATE_DES greater than E, Step 518.

Next, the process, in Step 520, determines whether TSS is greater than a calibrated number of samples, F; and whether AIRCHG span (i.e., SPAN) is greater than a calibration constant G, and EGR_RATE SPAN is greater than a calibrated constant H; and whether (MAX_LRS−MIN_LRS) is less than A*TSS; and whether SS_LR is greater than B*TSS; and whether SS_HR is greater than C*TSS, If so, the process to determine the coefficients B0, B1 and B2 begins using linear regression, Step 522; otherwise, more samples are taken.

A number of embodiments of the invention have been described. Nevertheless, it will be understood that various modifications may be made without departing from the spirit and scope of the invention. For example, while a linear relationship between a commanded EGR flow rate and the difference of MAP samples and INF_MAP_with_0_EGR computations has been described, in a more general process determining a polynomial relationship between a commanded EGR flow rate and the difference of manifold absolute pressure and inferred absolute pressure without EGR contribution from the obtained samples of the manifold pressure sensor and the estimated inferred manifold absolute pressures. In such case, the process compares the coefficients of the polynomial relationship predetermined coefficients. Accordingly, other embodiments are within the scope of the following claims.

What is claimed is:

1. A method for determining EGR flow in an internal combustion engine, such flow being from an exhaust manifold of the engine to an intake manifold of the engine through an EGR, valve, the method comprises:

providing an indication of the flow of exhaust gas into the intake manifold through such inlet from information provided by a mass air flow sensor disposed upstream of an exhaust gas inlet to the intake manifold and information provided by an manifold absolute pressure sensor disposed downstream of such exhaust gas inlet; and comparing the estimated exhaust gas flow into the intake manifold with a commanded exhaust gas flow to the EGR valve.

2. A method for determining EGR flow in an internal combustion engine, such flow being from an exhaust manifold of the engine to an intake manifold of the engine through an EGR valve, the method comprises:

determining actual manifold absolute pressure readings from an manifold absolute pressure sensor disposed downstream of an inlet for the EGR flow into the intake manifold;

obtaining readings of airflow into the intake manifold upstream of the EGR inlet;

computing an inferred manifold absolute pressures from the airflow readings;

obtaining samples of a desired EGR flow signal fed to a valve for controlling the EGR flow into the inlet;

determining coefficient B2, such coefficient being a function of: (A) the differences between the determined actual manifold absolute pressure readings and the calculated manifold absolute pressures; and (B) the obtained desired EGR flow samples;

comparing the determined coefficient B2 with a predetermined value for B2.

3. A system for determining EGR flow in an internal combustion engine, such flow being from an exhaust manifold of the engine to an intake manifold of the engine through an EGR valve, the system comprising:

an manifold absolute pressure sensor disposed downstream of such exhaust gas inlet;

an a mass air flow sensor disposed upstream of an exhaust gas inlet to the intake manifold for providing an indication of the flow of exhaust gas into the intake manifold through such inlet from information provided by the mass air flow sensor and information provided by the manifold absolute pressure sensor; and a processor for comparing the estimated exhaust gas flow into the intake manifold with a commanded exhaust gas flow to the EGR valve.

4. An article of manufacture, comprising:

a computer storage medium having a computer program encoded therein for determining EGR flow in an internal combustion engine, such flow being from an exhaust manifold of the engine to an intake manifold of the engine through an EGR valve, said computer storage medium comprising:

code for providing an indication of the flow of exhaust gas into the intake manifold through such inlet from information provided by a mass air flow sensor disposed upstream of an exhaust gas inlet to the intake manifold and information provided by an manifold absolute pressure sensor disposed downstream of such exhaust gas inlet; and code for comparing the estimated exhaust gas flow into the intake manifold with a commanded exhaust gas flow to the EGR valve.

5. The article of manufacture recited in claim 4 wherein the computer storage medium comprising a semiconductor chip.

* * * * *